Figures 1, 2:
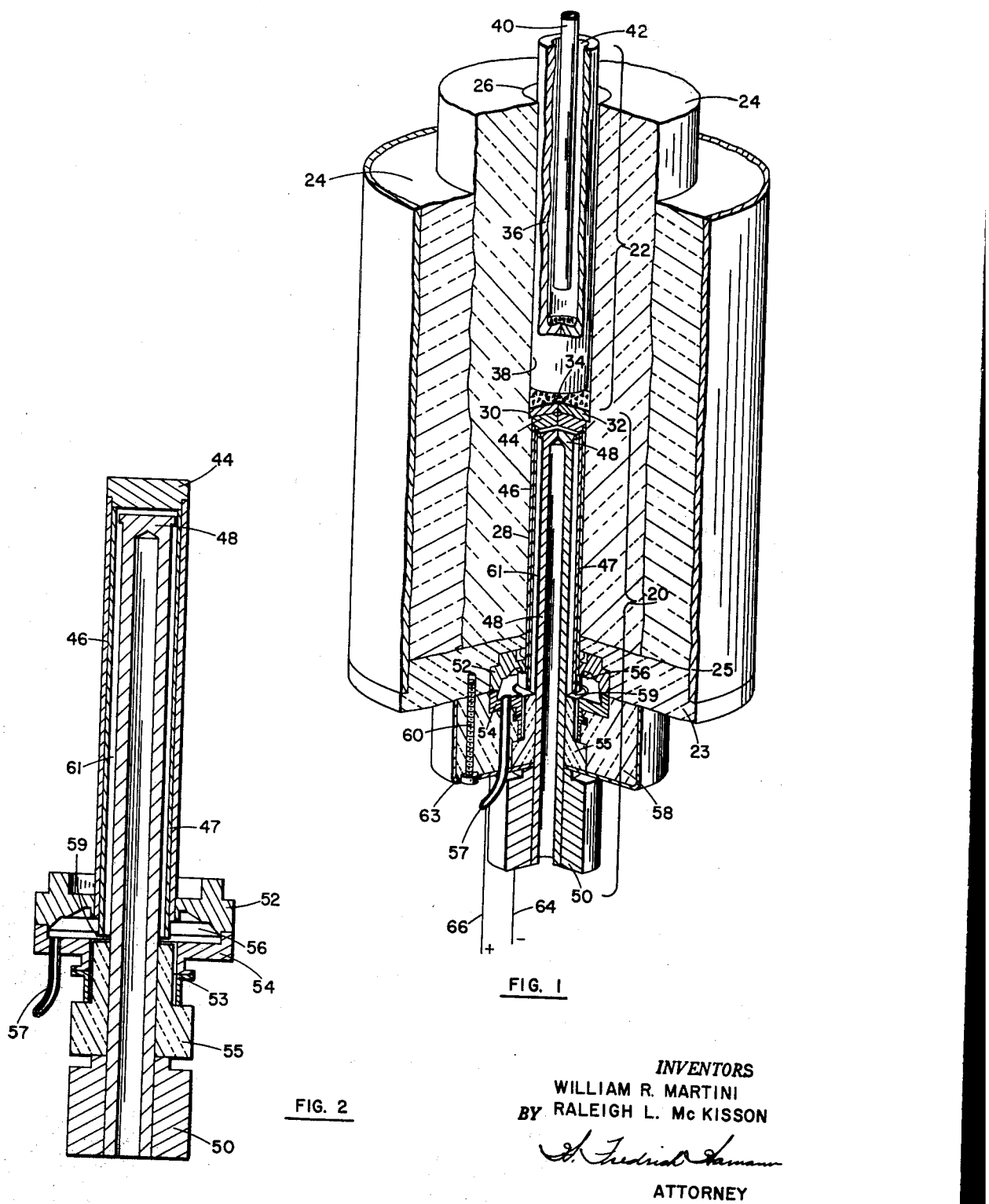

June 1, 1965     W. R. MARTINI ETAL     3,187,205

THERMIONIC CONVERTER

Filed Nov. 22, 1961

INVENTORS
WILLIAM R. MARTINI
BY RALEIGH L. McKISSON

ATTORNEY

United States Patent Office 3,187,205
Patented June 1, 1965

3,187,205
THERMIONIC CONVERTER
William R. Martini, Northridge, and Raleigh L. McKisson, Woodland Hills, Calif., assignors to North American Aviation Inc.
Filed Nov. 22, 1961, Ser. No. 154,242
5 Claims. (Cl. 310—4)

The present invention is directed to the conversion of heat to electricity and more particularly to a flame-heated thermionic converter.

The increased interest in direct conversion (see Nucleonics, vol. 17, No. 7, pp. 49–55, July 1959) has pointed up the need for a simple thermionic converter system for experimental use in studying the many parameters and relationships which must be known before practical application of thermionic conversion is feasible.

It is the primary purpose of the present invention to provide a simple thermionic converter for use in demonstrating and studying the direct conversion of heat to electricity.

It is another object of the present invention to provide a simple thermionic converter utilizing conventional fuels as a source of heat.

It is a further object of the present invention to provide a thermionic converter system having at least one conversion diode and a means for heating the diode which may be easily assembled and disassembled.

It is a still further object of the present invention to provide a combined heat source and heat conversion unit for directly converting a portion of the heat to electricity through the use of a thermionic cell.

These and other objects of the present invention will be more apparent from the following detailed description and the drawing, made a part hereof, wherein:

FIG. 1 shows a partially sectioned perspective view of the present invention; and FIG. 2 shows a detail sectional view of the thermionic diode of FIG. 1.

Referring now to FIG. 1 in more detail, the preferred embodiment of the present invention comprises generally a thermionic converter diode 20, a heating zone 22, and insulation 24, the insulation 24 being supported on insulating base 23 and having an outer shell 25. A cylindrical aperture 26 extends the length of the insulation 24 and has a reduced diameter portion 28 which forms a shoulder 30 about 4 in. from the bottom of 24 in. long aperture 26. A wafer 32 of silicon carbide is supported on the shoulder 30 and divides the aperture 26 into two zones, i.e., a heating zone 22 and a conversion zone, the latter containing the converter diode 20. A bed of chips 34 of zirconia —4 to +6 mesh, for example, is positioned on the upper surface of the wafer 32 and an alumina tube 36, e.g. 20 in. long, is supported with its end spaced from the wafer 32, and has a diameter such that an annular region 38 is formed between its outside surface and the inside surface of the insulation 24 forming aperture 26.

A fuel injection tube 40 of small diameter extends downwardly into the center of tube 36 and terminates above the chips 34. The chips 34 extend upwardly into the interior of tube 36, so that the combustion zone extends from a point within the lower end of tube 36 downwardly to the wafer 32 and then outwardly into the annular region 38. These chips hold and stabilize the combustion within the combustion chamber and aid in heat transfer to the wafer 32. The injection tube 40 and tube 36 define an annular air intake passage 42 which surrounds the injection tube 40. In this manner the air which passes down passage 42 is mixed with the fuel at the nozzle end of tube 40 and ignition takes place in the combustion chamber or zone by any means well known in the art. The combustion takes place in the bed of chips 34 and the exhaust gases pass up annular passage 38 around the heat exchanger tube 36. This countercurrent flow serves to preheat the incoming air and prevents the exhaust gases from preheating the fuel to too high a temperature.

Heat from the combustion chamber is conducted across the wafer 32 to the cathode 44 of the thermionic converter 20 (see FIG. 2). The cathode 44 is rigidly connected and sealed to the upper end of cylindrical cathode lead 46, and both are preferably of molybdenum which is coated with a molybdenum disilicide base coating to provide protection from oxidation. The end 44 is heated to a minimum temperature of 1400° C. by contact with the wafer 32 and the inner surface of this end emits electrons to the copper anode 48. The anode 48 is heated by these electrons, by radiation, and by gas conduction from the cathode 44. The anode-cathode geometry is plane parallel with the interelectrode spacing only a few mils. The cross section and length of the anode are such that the anode surface runs at from about 600° C. to about 700° C., while the anode boss 50 is at 300° C. Heat is transferred from the anode 48 to the anode boss 50 by conduction through the cylindrical portion of the anode 48. A heat shield 47 of molybdenum foil is spot welded along the inner surface of the cylindrical cathode lead 46. The cross section and length of the molybdenum tube 46 from the cathode surface to the stainless steel cathode flange 52 is designed for the optimum lead wire size.

Flanges are utilized throughout the present invention so that the thermionic converter and parts thereof may be easily assembled and disassembled. The cathode flange 52 is sealed to the cathode lead 46 and to a stainless steel cup-shaped container 54. The container 54 has a bottom flange sealed to the top of a metal flange 53 sealed to the surface of insulator 55 by silver solder or equivalent means. The container 54 and flange 52 form a hollow sealed chamber 56 into which a stainless steel cesium reservoir tube 57 is rigidly sealed, which tube extends through the insulating cap 58. Cap 58 is held in position by bolts 60 threaded into insulator 23. The chamber 56 communicates through gap 59 to the annular passage 61 between the anode 48 and the heat shield 47 on the cathode lead tube 46. The lower end of anode 48 is sealed to an insulator 55 which seals the lower end of the annular passage 61 while maintaining the spacing between the anode 48 and adjacent parts. The cup-shaped container 54 is held in place by outer cover 63 of cap 58 which has an aperture through which the anode 48 and boss 50 extend. The anode 48 has a central aperture terminating at the anode face to accommodate temperature measurements and has its end threaded, for example to accommodate boss 50 which acts as a heat radiator. The cesium reservoir 57 is an appendix to the converter diode and is located at the position of lowest temperature in the system. This reservoir 57 will control the pressure of the cesium vapor between cathode and anode. The exact pressure is extremely critical to the operation of the thermionic converter. Cesium reservoir temperatures of about 300° C. are preferred, although this temperature may vary between about 250° C. and about 400° C. In this manner the removal of bolts 60 allows the entire diode to slip from the aperture 28 without the necessity of disconnecting cesium reservoir connections or of breaking any seals in the device.

The electrical current take-off is shown schematically in FIG. 1 at 64 and 66. With an optimized load, 4.3 watts at ½ volt can be generated in the preferred embodiment of the present invention. Such operation utilizes propane fuel and air, both at about 1 p.s.i.g. pressure with the resulting combustion chamber temperature of from 1700 to 1900° C. A separate auxiliary electric heater adjacent to the cesium reservoir may be used for controlling the cesium pressure manually. The following table shows the dimensions and characteristics of the preferred embodiment.

*Table I*

| | |
|---|---|
| Overall efficiency | 0.2%. |
| Rated output voltage | 0.5. |
| Number of diodes | 1. |
| Cathode surface temperature | 1500° C. |
| Anode surface temperature | 700° C. |
| Cesium reservoir temperature | 330° C. |
| Cathode heat transfer area | 2.85 cm.$^2$. |
| Cathode emitting area | 2.85 cm.$^2$. |
| Cathode lead length | 3.85 in. |
| Anode lead length | 5 in. |
| Air inlet pressure | 0.8 in. Hg. |
| Fuel inlet pressure | 7.6 in. Hg. |
| Exhaust port diameter | 1 in. |
| Heat exchanger tube length | 18 in. |
| Heat exchanger tube diameter | ¾ in. |
| Heat exchanger wall thickness | ⅛ in. |
| Air inlet channel diameter | ¾ in. |
| Fuel flow rate | 27.5 cc./sec. |
| Air flow rate | 735 cc./sec. |

While the preferred embodiment utilizes only one diode, a plurality could be spaced around the combustion chamber, thereby materially increasing efficiency. However in the preferred embodiment only one diode is used, so that it may be replaced with diodes of different characteristics and dimensions to accommodate study and demonstration of thermionic conversion under various conditions. The arrangement of the diode support elements assures easy accessibility and removal of the diode, and simplifies changes in electrical connections.

It should be understood that this invention is not limited to the specific details of construction and arrangement thereof herein illustrated, and that changes and modifications may occur to one skilled in the art without departure from the spirit of the invention as defined in the following claims.

What is claimed is:

1. A thermionic converter comprising a heating zone and an adjacent conversion zone, with a combustion chamber in said heating zone; means for introducing air and fuel into said combustion chamber; means in said combustion chamber for stabilizing the combustion of said fuel in said chamber; a thermionic diode in said conversion zone having a cathode, an anode spaced from said cathode, and a source of ionizable gas connected to said diode and communicating with the space between said anode and cathode; and means for removably supporting said diode with said cathode in heat exchanging relationship with said combustion chamber.

2. A thermionic converter comprising a container; insulation in said container having a longitudinal passageway therethrough; a divider element transversely supported in said passageway and dividing said passageway into a heating zone and a conversion zone; a combustion chamber in said heating zone on one side of said element; means for introducing and maintaining a source of heat in said combustion chamber to heat said divider; a thermionic converter diode located in said conversion zone on the other side of said divider element; means for removably supporting said diode in said conversion zone, said diode having a cathode in heat exchanging engagement with said divider element.

3. A thermionic converter comprising a container; insulation in said container having a longitudinal passage therethrough; a divider element transversely supported in said passageway and dividing said passageway into a heating zone and a conversion zone; a combustion chamber in said heating zone on one side of said element; means for introducing fuel and air into said combustion chamber; means in said combustion chamber for stabilizing the combustion of said fuel; a thermionic converter diode located in said conversion zone on the other side of said divider element, said diode having a cathode with its outside surface in heat exchanging engagement with said divider and an anode surface in spaced parallel relationship to the inside surface of said cathode; means in said diode for introducing an ionizable gas between the inside surface of said cathode and the anode surface; and means for controlling the pressure of said gas, said diode being removably supported within said conversion zone.

4. A thermionic converter comprising a container; insulation in said container having a longitudinal passageway therethrough; a divider element transversely supported in said passageway and dividing said passageway into a heating zone and a conversion zone; a combustion chamber in said heating zone on one side of said element; means for introducing air and fuel into said combustion chamber; means in said chamber for stabilizing combustion of said fuel; a sealed thermionic diode in said conversion zone having a cathode and anode, the outside surface of said cathode being in heat exchanging engagement with and on the other side of said element; means in said diode for supporting said anode adjacent and in spaced relation to said cathode, said means including a seal located away from the cathode and anode surfaces and at a temperature substantially below the temperature of said surfaces; means for introducing an ionizable gas into the space between said anode and cathode, said last-named means including a source of ionizable gas located outside of said container and connected to said diode.

5. A thermionic converter comprising a container; insulation in said container having a longitudinal passageway therethrough; a heat transfer element supported in said passageway and dividing said passageway into a first and second zone; a combustion chamber on one side of said element in said first zone; means for introducing air and fuel into said combustion chamber; means for preheating said air in said first zone; and means in said combustion chamber for stabilizing combustion of said fuel, said last-named means including a bed of chips supported on said element; a sealed thermionic diode in said second zone having a cathode, anode, and ionizable gas chamber between said cathode and anode; and means for removably supporting said diode in said second zone with said cathode in heat exchanging contact with said element, said diode having a source of ionizable gas located outside said second zone and communicating with said gas chamber.

References Cited by the Examiner

UNITED STATES PATENTS

| | | | |
|---|---|---|---|
| 724,572 | 4/03 | Hall | 310—4 |
| 2,980,819 | 4/61 | Feaster | 310—4 |

FOREIGN PATENTS

| | | |
|---|---|---|
| 87,533 | 7/96 | Germany. |
| 403,291 | 4/43 | Italy. |
| 854,036 | 11/60 | Great Britain. |

MILTON O. HIRSHFIELD, *Primary Examiner.*

DAVID X. SLINEY, *Examiner.*